United States Patent [19]
Taylor

[11] 3,885,049
[45] May 20, 1975

[54] PREPARATION OF ACTIVE DRY YEAST

[75] Inventor: Robert Taylor, Alloa, Scotland

[73] Assignee: The Distillers Company (Yeast) Limited, England

[22] Filed: Mar. 16, 1973

[21] Appl. No.: 342,294

[30] Foreign Application Priority Data
Sept. 5, 1972 United Kingdom............ 41144/72

[52] U.S. Cl. .............. 426/18; 34/57 A; 195/74; 195/98; 426/60; 426/62; 426/465; 426/473
[51] Int. Cl. ............................................ C12c 11/32
[58] Field of Search ............. 99/96; 195/72, 82, 97, 195/98; 34/164, 57, 57 A; 426/60, 62, 443, 473, 18

[56] References Cited
UNITED STATES PATENTS

| | | |
|---|---|---|
| 1,420,558 | 6/1922 | Klein..................... 195/98 |
| 1,694,807 | 12/1928 | Brown.................... 195/98 |
| 2,876,557 | 3/1959 | Ducatteau............... 34/164 X |
| 3,780,181 | 12/1973 | Trevelyan............... 195/98 X |

FOREIGN PATENTS OR APPLICATIONS

| | | |
|---|---|---|
| 1,553,574 | 12/1968 | France |
| 279,524 | 7/1969 | Austria |

*Primary Examiner*—David M. Naff

[57] ABSTRACT

Active dry yeast is prepared by a process involving feeding crumbly yeast with air into a mill in which the yeast is disintegrated without substantial breakdown of yeast cells, carrying the yeast out of the mill in a stream of air, separating the yeast from the airstream and drying the yeast to a dry content of at lest 92 percent using a fluidized or spouted bed system.

4 Claims, 2 Drawing Figures

PATENTED MAY 20 1975　3,885,049

PREPARATION OF ACTIVE DRY YEAST

It is well known that active dried yeast can be made by drying moist yeast, for example having a dry matter content of 25 to 40 percent, to a dry matter content of 92 percent or more. Although active dried yeast can be stored more easily without loss during storage of activity than moist yeast it is unfortunately a fact that upon reconstitution the activity of the dried yeast is often not very satisfactory Another disadvantage of dried yeast is that it generally has to be reconstitued by soaking in water before it is mixed with the flour to form a dough for baking.

The most common processes for making active dried yeast have involved comminuting moist yeast under compression and then drying the particles thus obtained. The comminution has usually been effected by extruding the moist yeast through one or more orifices to form a material resembling spaghetti and then cutting the extruded strings of yeast with blades or allowing them to break under gravity into shorter lengths. The moisture content of the yeast that was extruded has varied according to the skills and equipment available to the operator. Many years ago the dry matter content of the yeast to be extruded was as low as 25 percent but more recently it can be considerably higher, for example 35 percent. The particles of yeast thus obtained have customarily been fairly large, for example having a diameter of 3 to 8 millimeters although it has been possible to obtain smaller particles. However such smaller particles have only been obtained previously by either forcing the moist yeast through very small orifices or by chopping it with knives into very small particles, or both. Accordingly the production of such small particles has always been associated with the application of considerable compression to the yeast.

After the particles have been obtained they have been dried by a variety of methods. Commercially probably the most common method has been to dry the particles in drum dryers, as a result of which the particles are rolled into substantially spherical particles having a hard surface that appears, to the eye, to be non-porous. Tray drying of the particles has also been proposed. Again, after drying, the particles have a fairly hard surface. All such particles require reconstitution in water prior to mixing with flour.

Typical of processes in which tray drying is used is the process described by Hixson in U.S. Pat. No. 1,420,630 and the process described by Brown in U.S. Pat. No. 1,694,807. Hixson describes that the drying is preferably conducted for 18 hours and that the yeast is preferably comminuted to pieces from 2 to 25 cubic millimeters in volume, comminution being by extrusion and chopping with knives. In order to promote uniformity of drying throughout each tray the particles in each tray were stirred during drying, and this tended to compress them into aggregates.

A very different process is described by Klein in U.S. Pat. No. 1,420,558. In this yeast is chopped in a closed apparatus by a cutting device into a finely divided state and the yeast is then carried through a curved duct and into a container of complex design including several compartments in a current of air while it is being dried, and is collected in the container. This process is unsatisfactory since, inter alia, the transportation and drying of yeast within the apparatus illustrated by Klein would incur substantial practical difficulties because while yeast is being dried through a moisture content of the order of 50 percent it passes through a very sticky phase and so the drying yeast would stick to the apparatus and clog it. So far as I am aware this process has never been used commercially.

More recently, Johnson in U.S. Pat. No. 2,919,194 proposed that active dried yeast should be made by forming a suspension of yeast in an oil and then removing the oil. He forms the suspension by, for instance, dispersing the yeast in corn oil in a Waring Blendor. Unfortunately it is extremely difficult to remove the oil from the yeast without damaging considerably the properties of the yeast and again this process has not, so far as I am aware, been found to be acceptable commercially despite the fact that in theory the process should have worked sufficiently well to produce yeast particles that were so fine that they could be reconstituted merely by mixing with flour, i.e., without any preliminary soaking in water.

According to the present invention active dried yeast is made by feeding crumbly yeast continuously into a mill through which air is passed and disintegrating the yeast in the mill, without any substantial breakdown of the yeast cells themselves, to a powder, continuously carrying the powder out of the mill in a stream of air, separating it from the airstream and then drying it to a dry matter content of at least 92 percent, the drying being conducted under particular conditions, described in more detail below, in the substantial absence of any force tending to compress the powder at least until the dry matter content exceeds 75 percent.

The method is carried out continuously in the sense that the yeast is gradually fed into the mill and is carried out from the mill substantially immediately upon its disintegration, whereas in a batch process all the yeast would have been fed into the mill, would have been subjected to chopping in the mill, and would then all have been removed from the mill after the chopping is completed. However in some instances it may be desirable only to operate the continuous process for a few minutes at a time, although in practice it will usually operate for several hours or longer without interruption. Whenever the process is discontinued the air supply will continue to be passed through the mill after the supply of yeast to the mill has been terminated, in order to ensure that all the yeast is carried out of the mill.

The yeast that is fed to the mill must be in a crumbly state. In practice this usually means that the dry matter content should be at least, say 28 or 29 percent, and preferably at least 30 percent although it is possible to operate at lower dry matter contents, for example 27 percent, if the yeast is treated in known manner to render it crumbly. Thus, for example, it is known that if extra-cellular water is removed from the yeast the yeast will be more crumbly, at a given dry matter content, than otherwise. Extra-cellular water can be removed by the use of dehydrating additives such as sodium chloride. Preferably the crumbly yeast has a dry matter content of from 30 to 40 percent when it is fed into the mill.

The crumbly yeast is preferably fed into the mill in particulate form, and the particles can be made in any convenient method. For example they can be made by comminuting compressed yeast, for example having a dry matter content of 30 to 40 percent, or less if the yeast has been treated with a dehydrating agent. Thus comminution can be effected by extruding a cake of compressed yeast through a bundle of orifices to form strings which conveniently are sub-divided into particles by being allowed to fall onto a surface. This surface may be a moving belt which carries the particles to the mill. The particles fed to the mill can be quite large, for example most of them having a size of from 3 to 8 millimeters in diameter and even larger particles, for example up to 2 centimeters, or smaller ones, for example down to 1 millimeter, can be fed to the mill.

In the mill the disintegration may be effected by the action of a high speed rotor, for example a set of blades that rotate as a high speed. Disintegration may be effected by the rotor directly, for example by impact between the yeast and edges of the blades, or, more usually, indirectly. Thus some at least, and often a predominant proportion, of the disintegration is effected not by impact between the blades and the yeast but by the air turbulence caused by the rotation of the blades. In fact all of the disintegration may be effected by air turbulence within the mill. Thus it is not necessary for the blades to be sharp and the blades can in fact be of a considerable thickness. Further, the mill can be a microniser in which all disintegration is brought about by air turbulence which need not be caused by any blades. Thus, for example, the mill may comprise a cylindrical chamber having a number of inlets by which air is introduced tangentially into the mill under high velocity.

When there is a rotor in the mill the mill preferably comprises a substantially cylindrical mill chamber. The rotor must rotate at high speed, for example at least 1,000 and usually at least 2,000 revolutions per minute and often considerably more, for example at least 5,000, at least 8,000 or even 12,000 revolutions per minute. Conveniently the diameter of the rotor is only slightly less than the diameter of the mill. For example the mill may comprise a cylindrical chamber and the diameter swept by the rotor blades may be at least 75 percent of the diameter of the chamber.

Conveniently the air and yeast are fed into the cylindrical chamber at a position substantially on the axis of the chamber, the rotor blades being pitched so as to suck the air into the chamber with the yeast. There is an outlet from the chamber, preferably in the base of the chamber, at a position through which the air and yeast is expelled.

In a preferred mill the mill chamber is cylindrical with its axis horizontal, air and chopped yeast are fed into the mill at a position at one end of the chamber on the axis of the cylinder and an outlet leads from the bottom of the chamber. The outlet is normally quite large and may occupy a substantial part of the total wall area of the lower half of the cylinder, i.e. it may be provided by cutting away a substantial part of the lower wall of the cylindrical chamber.

By appropriate design of the mill and by appropriate selection of the operating conditions of the mill it is possible to select appropriately the size of the particles leaving the mill. Generally substantially none of the particles are greater than 1.7 mm in diameter and preferably substantially all the particles have a diameter in the range 0.1 to 1 mm.

The amount of air supplied to the mill is not critical and it is merely sufficient that there should always be sufficient to reduce to a minimum the risk of blockage of the mill, and in particular the outlet of the mill. If the air supply is inadequate for any particular rate of supply of yeast of a particular moisture content the risk of blockage is increased. Preferably the amount of air supplied to the mill is so great that the yeast emerging from the outlet of the mill can be considered to be entrained in the air.

Generally, to avoid the risk of the yeast powder falling out of the air stream the stream of air and yeast is lead out of the mill through an exit that faces vertically downwards and the yeast is normally then immediately separated from the air stream.

The yeast powder occupies a very much greater volume than the volume occupied by the starting yeast. For instance, the volume is usually at least twice, and often at least 2.7 times and most usually at least 3 times the volume of a compressed cake of the same yeast of the same dry matter content.

After separating the yeast powder from the stream of air with which it is associated as it comes out of the mill it is dried. The drying is conducted at least until the dry matter content is at least 92 percent and preferably is conducted until the dry matter content is at least 95 percent or more. For example it may be 95 to 97.5 percent.

According to one aspect of the invention the drying is so conducted that a dry matter content of at least 92 percent, and preferably the final desired dry matter content, for example 95 to 97.5 percent, is reached in a period of from 10 minutes to 4 hours. The duration of drying is usually at least half an hour or 1 hour and is preferably less than 3 hours or, in many instances, 2 hours. It is found to be particularly satisfactory to conduct the drying in from 1 to 2½ hours.

Drying is preferably effected by contacting the yeast powder with a stream of warm gas, usually air. The gas generally has a temperature less than 100°C and preferably has a temperature of from 20° to 60°C, temperatures of from 32° to 55°C being very convenient. Although the air temperature may be quite high it is important that the yeast temperature should be kept as low as possible and generally the higher the temperature of the air the shorter will be the duration of drying.

The relative humidity of the air also affects the rate of drying and so should be selected appropriately. For example during the final stage of drying the relative humidity should preferably be less than 45 percent and most preferably less than 35 percent depending upon the temperature selected. Conveniently the air entering the dryer has a dew point of at least 16°C below that of the air leaving the dryer.

Drying may be effected by tray drying provided the drying conditions, for example temperature, humidity and rate of air circulation, are designed to achieve drying within the specified time, but preferably drying is effected by passing the warm gas, usually air, from below through a mass of the yeast powder at such a rate as to create a fluidised or spouted bed system in which the yeast particles are more less suspended in the gas steam. Thus the yeast powder may be dried in a drying chamber the base of which is a mesh or other porous support and then warm air is forced up through this support at a rate sufficient to keep the bed in agitation, and usually to keep it wholly fluidised.

Drying by a fluidised bed system forms a second aspect of the invention and may be conducted for more than 4 hours but, as stated, preferably it is conducted for 10 minutes to 4 hours.

The rate of flow of air or other gas should not be too great or else a substantial amount of entrainment of the yeast powder by the unwardly flowing stream may occur. It is easy to so control the rate of flow that little or no entraniment does occur. To prevent loss of yeast powder the fluidising air may be recycled and/or filters may be provided above the mass of yeast powder to collect any powder that is entrained in the air. For example there may be provided above the mass of yeast a bag filter or porous screen through which air can pass but not the yeast.

Most conveniently the drying by fluidised or spouted beds is conducted either on a batch system or semi-continuously. Thus the yeast coming from the mill may be collected in the fluidised bed vessel which is then positioned in the drying chamber and drying effected in that chamber until the desired moisture content is achieved. In a semi-continuous method the yeast is collected in a fluidised bed vessel and is then subjected to drying in a drying chamber having a plurality of stations, initial drying being conducted at the first station, the vessel then being moved to the second station where further drying is conducted and so on until the final station is reached at which drying is continued until the final desired moisture content is achieved. There may be, for example, six drying stations.

It is important that the drying is conducted in the substantial absence of any force tending to compress the powder at least until its dry matter content exceeds 75 percent. While the powder is still in the crumbly state, for example having a dry matter content below 40 percent, the application of some compression to the powder is acceptable and may occur when the powder is being collected from the mill and spread into trays or over a porous bed or into the fluidised bed vessel. Any aggregation between the particles of the powder is very weak and the aggregates are readily broken up before drying, for example by sieving, during drying if drying is in a fluidised or spouted bed or after drying simply by, for example, the action of sieving. However during the early stages of drying, for example when the dry matter content is increasing from about 40 to about 75 percent the particles become very sticky and if any compression is applied to them, for example if particles spread in trays are stirred by a mechanical mixer, serious aggregation of the particles may occur.

After the yeast has been dried to a dry matter content of at least 92 percent it may be sieved to remove large particles and this sieving has the effect of breaking many of the larger particles into smaller ones. If additional comminution of large particles is required the coarse friction from the sieving, or the entire dried powder, may be subjected to any convenient method of comminution. A particularly simple method of comminution is to pass the dried powder through the same mill as was used for disintegrating the crumbly yeast. Such comminution may then be followed by a sieving operation. The substantial proportion of the final powder obtained by the process, optionally after any comminution step, will normally have a diameter less than 0.5 mm and conveniently therefore the final step of the process may involve sieving through a sieve that removes any particles that are above 0.5 mm in diameter. preferably the particle size is less, for example the sieve used being one that removes particles above 0.35 mm in diameter.

The dried yeast obtained by the invention can be stored in a dry atmosphere even at elevated temperatures without substantial deterioration on storage. It can be reconstituted before use by soaking but preferably either by exposure to an ambient humid atmosphere, for example having a humidity of about 33 percent at 20°C, or by being mixed with an excess of flour, which as used for baking usually has a water content of about 13 to 15 percent, whereupon a slow dehydration occurs by the interchange of water between the flour and the yeast. A dough is formed by mixing water and it is found that the yeast then has good activity. The dough is subsequently baked to form a baked product.

Advantages of the invention additional to those discussed already are that substantially all the yeast subjected to drying is either directly usable or can be easily comminuted into a usable form. Also disintegration is effected without the yeast cells themselves being damaged or subjected to any substantial breakdown, whereas in some prior processes involving fine comminution of a yeast cake damage to the yeast cells themselves can easily occur.

Any strain of yeast suitable for forming active dried yeast may be used as the starting material in the invention. It may have, for example, a nitrogen content of at least 7 percent.

Apparatus suitable for the production of a powder, ready for drying is illustrated in the accompanying drawings. In these:

FIG. 1 is a diagrammatic illustration of the apparatus while

Figure 1:
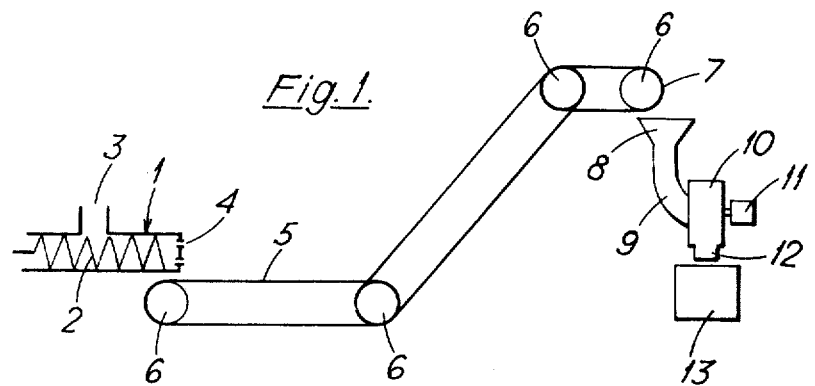

The apparatus comprises an extruder 1 having a screw 2 by which yeast introduced through an inlet 3 is forced through orifices 4. After extrusion through the orifices it falls onto an endless conveyor 5 which passes around and over suitable guide rollers 6 to the point 7 where the yeast drops off the belt into a hopper 8. A duct 9 leads from the hopper 8 to a mill 10 powered by an electric motor 11 and having an outlet 12. This outlet opens vertically downwards over a recepticle 13.

Figure 2:
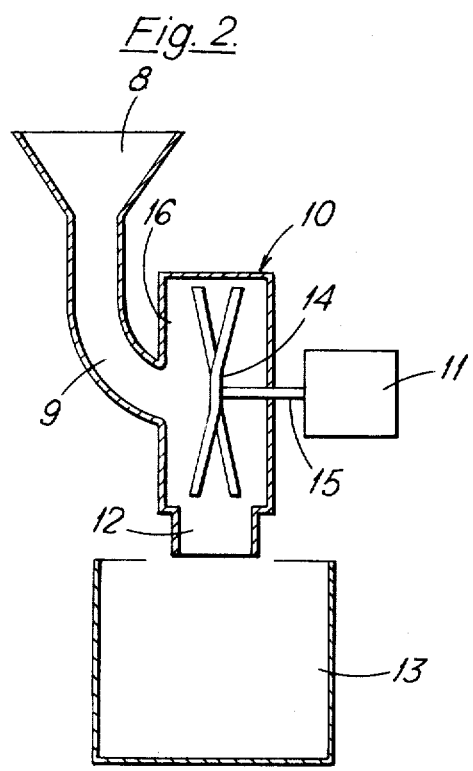
FIG. 2 is a section of part of the apparatus.

Referring to FIG. 2, the mill 10 comprises a cylindrical chamber 16 containing a four bladed rotor 14 mounted on a shaft 15 that is coaxial with the chamber and with the inlet from the duct 9. In a typical example the chamber 16 may be 8 inches in diameter and each of the blades of the rotor 3.75 inches in radius.

The following is an example of the invention.

A yeast cake having a dry matter content of 31.7 percent was obtained from a yeast factory where it had been propagated in an aerated molasses medium. The yeast cake was one that was suitable for use in the manufacture of spherical pellets of active dried yeast on a commerical scale. It had a nitrogen content of 7.2 percent and a phosphorous content of 2.1 percent (as $P_2O_5$) calculated on a dry matter basis.

The yeast cake was then granulated in an apparatus as illustrated in the drawings and in which the orifices 4 in the extruder have a diameter of 5 mm and yeast was extruded through these as strips which broke and fell as pieces of irregular granular shape onto the belt 5. They were carried on the belt up to the hopper 8 and fed into the mill 10, this being a modified Cristy and Norris 8 inches diameter beater mill that rotates at 8,000 rpm. Air was continuously sucked into the mill through the duct 9 and the yeast was disintegrated in the mill and was blasted out of the mill, entrained in air, through the outlet 12. It was collected in a container 13 and was then dried in a fluidised bed. The diameter of the bed was 76 centimeters, the depth of the yeast in the bed before fluidising was 23 centimeters and during fluidising was 38 centimeters. The base of the bed was formed of 200 mesh stainless steel gauze supported on a perforated plate having holes three-sixteenths inch diameter. Fluidising was effected by passing air having a temperature of 46°C and a relative humidity of 30 percent up through this screen at the rate of up to 3000 c.f.m. A bag filter was positioned over the vessel, the bag filter having aperture sizes of less than 50 microns.

Drying was continued in this manner for 120 minutes, whereupon it was found that the dry matter content of the yeast was 95.1 percent.

The product was sieved to a mean particle size of 0.225 mm, and was packed in sealed containers. After storage it could be mixed directly with flour, and then with water to form a dough, without previous reconstitution, and the dough then baked.

In this process the volume of the yeast particles in the container 13 was found to be 2.71 times the volume of the yeast cake supplied to the extruder through the inlet 3, and the volume after drying was 0.66 times that of the original yeast cake and the weight was about one third of the original cake. The product was a fine, free-flowing powder the particles of which could be seen by the eye to be of an irregular shape and to have a porous nature.

I claim:

1. A process in which active dried yeast is made by feeding crumbly yeast having a dry matter content of 27 to 40 percent and a particle size of 1 mm to 2 cm continuously into a mill, said mill having a substantially cylindrical milling chamber, an inlet substantially on the axis of the chamber and an outlet leading from the cylindrical wall of the chamber, and a rotor mounted on a shaft coaxial with the milling chamber for high speed rotation, the blades on the rotor being so pitched that upon rotation of the rotor air is drawn in through the inlet and expelled through the outlet, said mill being operated at a speed of at least 1000 rpm, continuously feeding air through said mill, disintegrating the yeast in the mill, without any substantial breakdown of the yeast cells themselves, at least predominantly by air turbulence in the mill, to form a disintegrated yeast powder wherein substantially none of the particles thereof are greater than 1.7 mm in diameter and wherein the volume of the disintegrated yeast is at least twice the volume of a compressed cake of the same yeast of the same dry matter content, continuously carrying the disintegrated yeast powder out of the mill in a stream of air, separating it from the airstream and then drying it to a dry matter content of at least 92 percent, the drying being conducted by passing warm air at a temperature of less than 100°C up through a bed of the powder for a period of 10 minutes to 4 hours in such a manner as to form a fluidized or spouted bed system.

2. A process according to claim 1 in which the drying to a dry matter content of at least 92 percent is achieved in from 1 to 2½ hours.

3. A process in which dried yeast obtained by a process according to claim 1 is reconstituted by being dry mixed with flour, and in which the mixture of yeast and flour is subsequently converted to a dough.

4. The process according to claim 1, wherein the air leaving the bed is passed through a filter located above the bed, the yeast in the air being collected by the filter.

* * * * *